United States Patent Office 3,033,592
Patented May 8, 1962

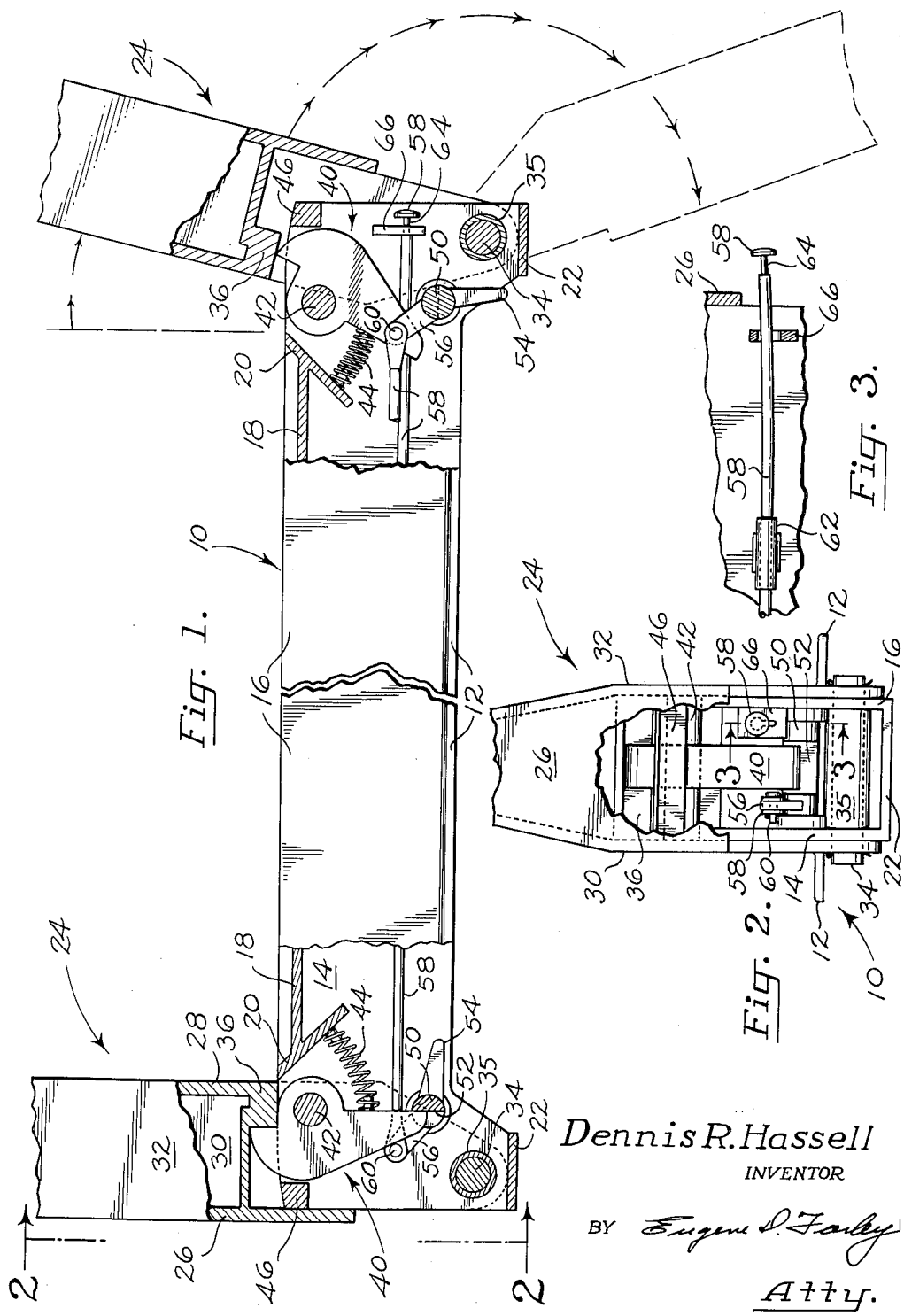

3,033,592
LOG BUNK WITH STAKE EASILY RELEASABLE FROM A REMOTE STATION
Dennis R. Hassell, 751 Clay St., Ashland, Oreg.
Filed Apr. 20, 1959, Ser. No. 807,505
5 Claims. (Cl. 280—145)

This invention relates to log bunks of the class used for retaining and supporting logs on trucks, railroad cars and other vehicles.

Vehicles employed in transporting logs are provided with two or more bunks extending transversely of the vehicle body at spaced intervals and provided at their ends with stakes for retaining the logs loaded on the vehicle. After the load has been transported to its destination and is ready to be discharged, the stakes are released, permitting the logs to roll off. Because of the great weight and cumbersome character of the logs, their transportation and discharge in this manner obviously is dangerous, and many accidents are caused by failure of the bunk or stake mechanism.

Accordingly the general objects of the present invention include the provision of a log bunk equipped with stakes which hold the logs secured during transportation, which is tripped easily from a remote station without danger, which is latched at a station adjacent the stake, which has a long service life, which does not become clogged with bark and dirt, which is protected from damage by falling logs, which may be locked positively but without sticking, and which is of simple construction.

In the drawings:

FIGS. 1 and 2 are fragmentary side and end elevations, respectively, partly broken away, of the herein described log bunk, FIG. 2 being taken along line 2—2 of FIG. 1; and FIG. 3 is a detail sectional view taken along line 3—3 of FIG. 2 and illustrating the remote station latch release mechanism.

In FIG. 1 the log bunk of the present invention is illustrated with the left hand stake upright in its latched, log-retaining position, and the right hand stake in its unlatched, log-discharging position. The bunk itself comprises a frame 10, the length of which is substantially equal to the width of the vehicle. It is provided with means, not illustrated, for mounting it centrally, pivotally of the vehicle frame. Customarily two such bunks are provided, one at the front and one at the back of the vehicle, and each having a releasable stake at each end.

Frame 10 is generally of channel shape and includes a base plate 12 and a pair of side plates 14, 16. A cover plate 18 may be welded between side plates 14, 16 for shielding the bunk mechanism. Cross pieces 20 are welded across the frame one at each end.

Side plates 14, 16 extend beyond plate 12 at each end of the frame, the extensions being of greater width than the body of the side plates. Plates 22 are welded across the bottom of the side plate extensions. This forms a chamber for reception of the stake mounting and operating mechanism.

Stakes 24 are pivotally mounted one at each end of the bunk frame, and may be generally rectangular in cross section. Thus they comprise a front plate 26, a back plate 28 and a pair of side plates 30, 32.

The stake side plates are of substantial length and overlie the extensions of side plates 14, 16 of the bunk frame. Back plates 28 of the stakes are of restricted length, their lower ends extending, when the stake is in latched position, to approximately the upper edge of the frame. Front plates 26 of the stakes are longer than the back plates thereof and extend across and seal off the front of the chamber formed in part by the plates of which the bunk frame is composed.

For mounting the stakes pivotally there are provided pins 34 extending through bunk frame side plates 14, 16 at the lower portions of the terminal extensions thereof. A sleeve 35 extends between side plates 30, 32 of the stakes and is journaled on the pin. Hence, the stakes can be moved angularly between raised positions in which a log load is retained on the vehicle, and lowered positions in which the logs may be discharged from the vehicle.

Latch means are provided for releasably locking the stakes in their raised positions. To this end, latch blocks 36 are welded across the bottom portion of the stakes, and latches 40 are positioned for engagement therewith.

Each latch comprises a shank and head portion and is pivotally mounted on a pin 42 extending between side plates 14, 16 of the bunk frame. A suitable spring 44 is provided for urging the latch normally to its advanced, latching position.

The latch head has an angled working surface dimensioned for latching engagement with the latch block 36. It also has a rounded outer surface designed to clear the cross frame member 46.

Latch 40 is angularly movable between latched and unlatched positions. It is maintained in latched position by detent means which in the illustrated form of the invention comprises a rock shaft 50 journaled between frame side plates 14, 16 and having a flat detent surface 52. The detent means is operated in a latching function from a station adjacent the stake by means of a short lever 54 rigid to the rock shaft. It is operated in an unlatching function from a station remote from the stake by means of a second lever 56 to which one end of a connecting rod 58 is connected by means of pin 60.

Connecting rod 58 extends along frame 10, being guided by sleeve 62. Its remote end is formed with a section 64 of reduced diameter which works in a keyhole-shaped guide 66. Accordingly, by operation of the connecting rod, rock shaft 50 may be moved between the latched position of the left hand stake of FIG. 1 and the unlatched position of the right hand stake of the same figure.

The operation of the herein described bunk assembly is readily apparent from the foregoing and from the drawings. When logs are loaded into the vehicle, the stakes are in their upright position, i.e. the left hand position of FIG. 1. Latches 40 are securely seated against latch blocks 36. Rock shaft 50 is positioned with its flat detent surface 52 firmly engaging the shank of latch 40. The outer ends of connecting rod 58 are securely seated in the restricted portions of the keyhole slot in guide 66. Accordingly the latches are locked and can not become unlatched until it is desired to discharge the logs.

When this is desired, the appropriate one of connecting rods 58 is lifted out of keyhole guide 66 and withdrawn, i.e. moved from the position of FIG. 1 to the position of FIG. 3. This rotates rock shaft 50 clockwise, releasing flat detent surface 52 thereof from the shank of latch 40 and permitting the latch to rotate about the pin 42. The weight of the logs then pushes the stake 24 outwardly to log-discharging position.

As soon as stake 24 has cleared the latch in the foregoing sequence, spring 44 returns the latch to its latching position. Then after the logs have been unloaded, the stake may be lifted upwardly. As the stake is thus raised, the operator rotates the latch 40 in a counterclockwise direction, FIG. 1, an amount sufficient to permit the latch block 36 to clear the latch. The latter is released when the stake reaches its upright position whereupon latch block 36 again is seated in the angled working surface of the latch. Detent rock shaft 50 then may be rotated in a counterclockwise direction by means of lever arm 54. This seats the locking section 64 of connecting rod 58 in the keyhole slot present in guide 66, securely locking the latch in place. Since this may be done by the operator from the discharge side of the vehicle, without the necessity of walking around to the other side, insurance is provided that the latch will indeed be locked and not forgotten, a factor of obvious importance in preventing accidents when the next load of logs is placed on the bunks.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A log bunk comprising a frame adapted for mounting transversely of a vehicle, a stake, pivot means securing the lower end of the stake to an end of the frame for angular movement between raised and lowered positions, a stake latch pivotally mounted on the said end of the frame and having an outwardly extending shank, the latch being movable between latched and unlatched positions with respect to the stake, detent means positioned for engagement by the latch shank and for retaining the latch in its latching position, first detent operating means connected to the detent for operating the same at a station adjacent the stake, and second detent operating means connected to the detent and extending toward the other end of the frame for releasing the latch and hence the stake at a station remote from the stake.

2. The log bunk of claim 1 wherein the detent means comprises a rock shaft having a detent surface for engagement by the latch shank and the first detent operating means comprises lever means connected to the rock shaft.

3. The log bunk of claim 1 wherein the first detent operating means comprises a rock shaft having a lever connected thereto.

4. The log bunk of claim 3 wherein the second detent operating means comprises lever means pivoted to a connecting rod extending along the frame to a station remote from the latch, and wherein securing means are provided at such station comprising a guide of keyhole shape and a segment of the connecting rod of reduced diameter dimensioned to work therein for releasing and securing the connecting rod as desired.

5. A log bunk comprising a frame adapted for mounting transversely of a vehicle, a stake, pivot means securing the lower end of the stake to an end of the frame for angular movement between raised and lowered positions, a stake latch pivotally mounted on the said end of the frame and having an outwardly extending shank, the latch being movable between latched and unlatched positions with respect to the stake, a rock shaft having a detent surface for engagement by the latch shank for retaining the latch in its latching position, a first lever rigid to the rock shaft for operating the same at a station adjacent the stake, and a second lever rigid to the rock shaft and pivotally connected to a connecting rod for operating the rock shaft at a station remote from the stake.

References Cited in the file of this patent

UNITED STATES PATENTS

| | | |
|---|---|---|
| 1,838,736 | Bonham | Dec. 29, 1931 |
| 2,530,776 | Tourneau | Nov. 21, 1950 |
| 2,828,140 | Hassell | Mar. 25, 1958 |